US009473030B2

(12) United States Patent
Hosotani (10) Patent No.: US 9,473,030 B2
(45) Date of Patent: *Oct. 18, 2016

(54) SWITCHING POWER SUPPLY APPARATUS INCLUDING CONTROLLER THAT SWITCHES A SWITCHING UNIT BASED ON THE AMOUNT OF CHARGE IN A CHARGE UNIT

(71) Applicant: Murata Manufacturing Co., Ltd., Nagaokakyo-shi, Kyoto-fu (JP)

(72) Inventor: Tatsuya Hosotani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 143 days.

This patent is subject to a terminal disclaimer.

(21) Appl. No.: 14/444,054

(22) Filed: Jul. 28, 2014

(65) Prior Publication Data

US 2014/0334185 A1  Nov. 13, 2014

Related U.S. Application Data (63) Continuation of application No. PCT/JP2012/080270, filed on Nov. 22, 2012.

(30) Foreign Application Priority Data

Feb. 3, 2012 (JP) ................... 2012-021437

(51) Int. Cl.
*H02M 3/24* (2006.01)
*H01M 10/44* (2006.01)
(Continued)

(52) U.S. Cl.
CPC ............. *H02M 3/24* (2013.01); *H01M 10/44* (2013.01); *H02J 7/0068* (2013.01); *H02J 7/34* (2013.01);
(Continued)

(58) Field of Classification Search
CPC ............ H02M 3/24; H02M 10/44; H02M 2001/007; H02M 2001/0032; H02M 2001/0035; H02M 2001/0048
See application file for complete search history.

(56) References Cited

U.S. PATENT DOCUMENTS 5,515,261 A * 5/1996 Bogdan ............... H02M 1/4225
323/222
5,894,412 A * 4/1999 Faulk .................. H02M 1/4225
307/82

(Continued)

FOREIGN PATENT DOCUMENTS

JP  9-37475 A  2/1997
JP  2000-4547 A  1/2000

(Continued)

OTHER PUBLICATIONS

Official Communication issued in corresponding International Application PCT/JP2012/080270, mailed on Feb. 5, 2013.

(Continued)

*Primary Examiner* — Timothy J Dole
*Assistant Examiner* — Yusef Ahmed
(74) *Attorney, Agent, or Firm* — Keating & Bennett, LLP (57) ABSTRACT

A switching power supply apparatus includes an isolated converter that has efficiency characteristics in which power conversion efficiency at a rated load is higher than power conversion efficiency at a light load and that converts power-supply voltage into direct-current voltage to output the direct-current voltage; an FET that switches supply and shutoff of the power-supply voltage to the isolated converter; a secondary battery that stores the direct-current voltage output from the isolated converter; a voltage detector that detects an amount of charge in the secondary battery; and a controller that switches the FET on the basis of the amount of charge in the secondary battery.

15 Claims, 7 Drawing Sheets

(51) Int. Cl.
*H02J 7/34* (2006.01)
*H02M 7/217* (2006.01)
*H02J 7/00* (2006.01)
*H02M 1/00* (2006.01)

(52) U.S. Cl.
CPC ... *H02M 7/2176* (2013.01); *H02M 2001/0032* (2013.01); *H02M 2001/0048* (2013.01); *Y02B 40/90* (2013.01); *Y02B 70/1491* (2013.01); *Y02B 70/16* (2013.01)

(56) References Cited

U.S. PATENT DOCUMENTS

| | | | | |
|---|---|---|---|---|
| 6,002,596 | A * | 12/1999 | Mayer | H02M 1/40 363/21.04 |
| 6,879,132 | B2 * | 4/2005 | Oki | H02J 7/34 320/128 |
| 7,102,898 | B2 * | 9/2006 | Brkovic | H02M 1/088 363/17 |
| 7,382,063 | B2 * | 6/2008 | Mullet | E05F 15/00 307/64 |
| 7,705,562 | B2 * | 4/2010 | Takahashi | H02J 9/061 307/46 |
| 7,719,252 | B2 * | 5/2010 | Takada | H01M 8/04186 323/299 |
| 8,410,749 | B2 * | 4/2013 | Oto | H01M 10/44 320/101 |
| 9,054,556 | B2 * | 6/2015 | Hoshino | H02J 7/34 |
| 2002/0023235 | A1 * | 2/2002 | Odaohhara | G06F 1/263 713/320 |
| 2004/0120163 | A1 * | 6/2004 | Nakagawa | H02M 3/33523 363/20 |
| 2007/0047100 | A1 * | 3/2007 | Takahashi | H02J 9/061 359/689 |
| 2007/0138971 | A1 * | 6/2007 | Chen | H05B 39/045 315/209 R |
| 2007/0247084 | A1 * | 10/2007 | Zhao | H05B 39/045 315/291 |
| 2008/0174276 | A1 * | 7/2008 | Takahashi | H02J 9/061 320/128 |
| 2008/0238363 | A1 * | 10/2008 | Bourilkov et al. | H02J 7/0073 320/107 |
| 2009/0024255 | A1 * | 1/2009 | Penzenstadler | H02J 3/1842 700/297 |
| 2009/0243390 | A1 * | 10/2009 | Oto | H02J 7/34 307/43 |
| 2009/0290387 | A1 * | 11/2009 | Wheeler | H02M 3/33507 363/21.01 |
| 2010/0026208 | A1 * | 2/2010 | Shteynberg | H05B 33/0815 315/297 |
| 2010/0073974 | A1 * | 3/2010 | Zeng | G01R 19/04 363/84 |
| 2010/0246224 | A1 * | 9/2010 | Zhang | H02J 1/102 363/123 |
| 2011/0051476 | A1 * | 3/2011 | Manor | H02M 1/14 363/65 |
| 2011/0127943 | A1 * | 6/2011 | Oto | H01M 10/44 320/101 |
| 2011/0156643 | A1 * | 6/2011 | Chen | B60L 11/1811 320/109 |
| 2011/0175452 | A1 * | 7/2011 | Hoshino | H02J 7/34 307/66 |
| 2012/0091970 | A1 * | 4/2012 | Cho | H02J 7/022 320/160 |
| 2013/0076143 | A1 * | 3/2013 | Guo | H02J 9/04 307/66 |
| 2013/0088196 | A1 * | 4/2013 | Chen | B60L 11/1811 320/109 |
| 2013/0293192 | A1 * | 11/2013 | Abe | B60L 11/123 320/108 |
| 2014/0015496 | A1 * | 1/2014 | Nishiguchi | H02J 7/007 320/162 |
| 2014/0176049 | A1 * | 6/2014 | Yamada | H02J 7/025 320/107 |
| 2014/0321169 | A1 * | 10/2014 | Mueller | H02M 3/33515 363/21.02 |
| 2015/0008739 | A1 * | 1/2015 | Albu | H02M 5/00 307/23 |

FOREIGN PATENT DOCUMENTS

| | | |
|---|---|---|
| JP | 2002-62952 A | 2/2002 |
| JP | 2003-87997 A | 3/2003 |
| JP | 2007-68338 A | 3/2007 |
| JP | 2007-312499 A | 11/2007 |
| JP | 2008-278631 A | 11/2008 |
| JP | 2009-153339 A | 7/2009 |
| JP | 2010-41826 A | 2/2010 |

OTHER PUBLICATIONS

Official Communication issued in corresponding Chinese Patent Application No. 201280068558.2, mailed on Dec. 8, 2015.
Official Communication issued in corresponding Japanese Patent Application No. 2013-556206, mailed on Mar. 10, 2015.

* cited by examiner

|  | STANDBY MODE | OPERATION MODE |
|---|---|---|
| OUTPUT POWER | Pstby | Prate |
| ACCUMULATED TIME | h1 | h2 |
| EFFICIENCY | $\eta$ low | $\eta$ rate |

FIG. 5B

| | STANDBY MODE | | OPERATION MODE | |
|---|---|---|---|---|
| | DRIVE STATE | FROZEN STATE | DRIVE STATE | FROZEN STATE |
| OUTPUT POWER | Pmid | Pstby | Pmax | Prate |
| ACCUMULATED TIME | h3 | h1−h3 | h4 | h2−h4 |
| EFFICIENCY | $\eta$ high1 | $\eta$ high2 | $\eta$ rate1 | $\eta$ rate2 |

SWITCHING POWER SUPPLY APPARATUS INCLUDING CONTROLLER THAT SWITCHES A SWITCHING UNIT BASED ON THE AMOUNT OF CHARGE IN A CHARGE UNIT

BACKGROUND OF THE INVENTION

1. Field of the Invention

The present invention relates to a switching power supply apparatus capable of improving its power conversion efficiency to reduce power usage.

2. Description of the Related Art

It is desirable in recent years to reduce power loss when an apparatus is not used in terms of energy saving. Japanese Unexamined Patent Application Publication No. 2002-62952 discloses an apparatus that stops supply of power from a power supply unit, such as an analog-to-digital adapter, to a system at power-off or at light-load and supplies the power from a battery that is charged to the system to reduce the power loss.

However, the apparatus described in Japanese Unexamined Patent Application Publication No. 2002-62952 performs control so as to switch the supply of the power from the power supply unit to the battery depending on the state of the load, regardless of the state of the battery. Accordingly, there are problems in that it is not possible to effectively use the energy of the battery and, thus, the reduction effect of the power usage is small. In addition, the apparatus described in Japanese Unexamined Patent Application Publication No. 2002-62952 has problems in that, since it is necessary to provide a circuit to control charge and discharge of the battery or a circuit to control output voltage from the battery, the power conversion efficiency at the light-load is degraded to increase the annual power usage, compared with a case in which the power is directly supplied from the power supply unit to the load. Furthermore, since the control is performed so as to switch the supply of the power from the power supply unit to the battery depending on the state of the load, the charge and discharge of the battery is frequently repeated if the state of the load is frequently varied. As a result, there is a problem in that the battery is deteriorated to shorten the life of the battery.

SUMMARY OF THE INVENTION

Preferred embodiments of the present invention provide a switching power supply apparatus capable of effectively reducing or minimizing power usage.

According to a preferred embodiment of the present invention a switching power supply apparatus includes a converter circuit that is configured to have efficiency characteristics in which the power conversion efficiency at a rated load is higher than the power conversion efficiency at a light load and that converts power-supply voltage into direct-current voltage to output the direct-current voltage; a switching unit configured to switch supply and shutoff of the power-supply voltage to the converter circuit; a charge unit configured to store the direct-current voltage output from the converter circuit; a detecting unit configured to detect an amount of charge in the charge unit; and a controller configured and programmed to switch the switching unit based on the amount of charge detected by the detecting unit. The controller is configured and programmed to set the switching unit to the shutoff state if the amount of charge in the charge unit is higher than a first threshold value and set the switching unit to the supply state if the amount of charge in the charge unit is lower than a second threshold value. The controller is configured and programmed to output the direct-current voltage subjected to the conversion in the converter circuit and store the direct-current voltage subjected to the conversion in the converter circuit in the charge unit when the switching unit is in the supply state and output the direct-current voltage stored in the charge unit when the switching unit is in the shutoff state. A frozen period in which the switching unit is in the shutoff state is controlled depending on an increase and a decrease of output power and the frozen period is lengthened with the decreasing output power.

In the switching power supply apparatus having the above configuration, the supply state and the shutoff state in the switching unit are controlled in accordance with the amount of charge in the charge unit. The frozen period in which the switching unit is in the shutoff state is controlled in accordance with increase and decrease of the output power and the frozen period is lengthened with the decreasing output power to operate the switching power supply apparatus in a high-efficiency state, thereby reducing accumulated power usage.

The switching power supply apparatus may include a voltage conversion unit configured to perform voltage conversion of the direct-current voltage output from the charge unit.

With the above configuration, it is possible to keep the output with a high precision, specifically, it is possible to output constant voltage even if the direct-current voltage from the charge unit is varied.

The voltage conversion unit is, for example, a DC-DC converter.

With the above configuration, it is possible to reduce the power loss, for example, compared with a case in which voltage control is performed by a dropper method, to reduce the accumulated power usage.

The switching unit is, for example, a transistor.

With the above configuration, it is possible to reduce the size of the switching unit.

The switching unit is, for example, a mechanical switch (relay).

With the above configuration, it is possible to block a power line with mechanical contacts to improve the safety at the shutoff, thus improving the reliability at the shutoff.

The charge unit may be a secondary battery.

With the above configuration, the use of the secondary battery allows the amount of charge to be increased to further lengthen the time during which the power is supplied from the secondary battery to the load. As a result, it is possible of drive the converter circuit with a high efficiency to reduce the accumulated power usage.

The charge unit may be a capacitor.

With the above configuration, since the capacitor has a long life even with the increasing number of times of charge and discharge, compared with the secondary battery, it is possible to lengthen the lives of the switching power supply apparatus and the charge unit.

The charge unit may be an electric double layer capacitor.

With the above configuration, it is possible to increase the amount of charge, compared with the case in which the charge unit is the normal capacitor, to lengthen the time during which the voltage is supplied from the electric double layer capacitor to the load. Accordingly, the time during which the power is supplied from the charge unit to the load is lengthened and the ratio of the time during which the converter operates is relatively decreased to reduce the accumulated power usage.

The converter circuit may include a synchronous rectifier circuit.

With the above configuration, it is possible to reduce voltage drop when current flows and the loss in the rectifier device, compared with diode rectification (asynchronous rectification), to realize high efficiency.

The converter circuit may be an isolated converter including an isolated transformer, and the controller may be provided at a primary side of the converter circuit.

With the above configuration, it is possible to directly control the switching unit to reduce the size of the circuit that controls the switching in the switching unit.

The converter circuit may be an isolated converter including an isolated transformer, and the controller may be provided at a secondary side of the converter circuit.

With the above configuration, it is possible to directly monitor and control the state of the charge unit to reduce the sizes of a monitor circuit and a control circuit in the charge unit.

According to various preferred embodiments of the present invention, the configuration is adopted in which the charge unit is used if the load is capable of being driven with the amount of charge in the charge unit, it is possible to constantly operate the converter circuit in the high-efficiency state to reduce the accumulated power usage.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
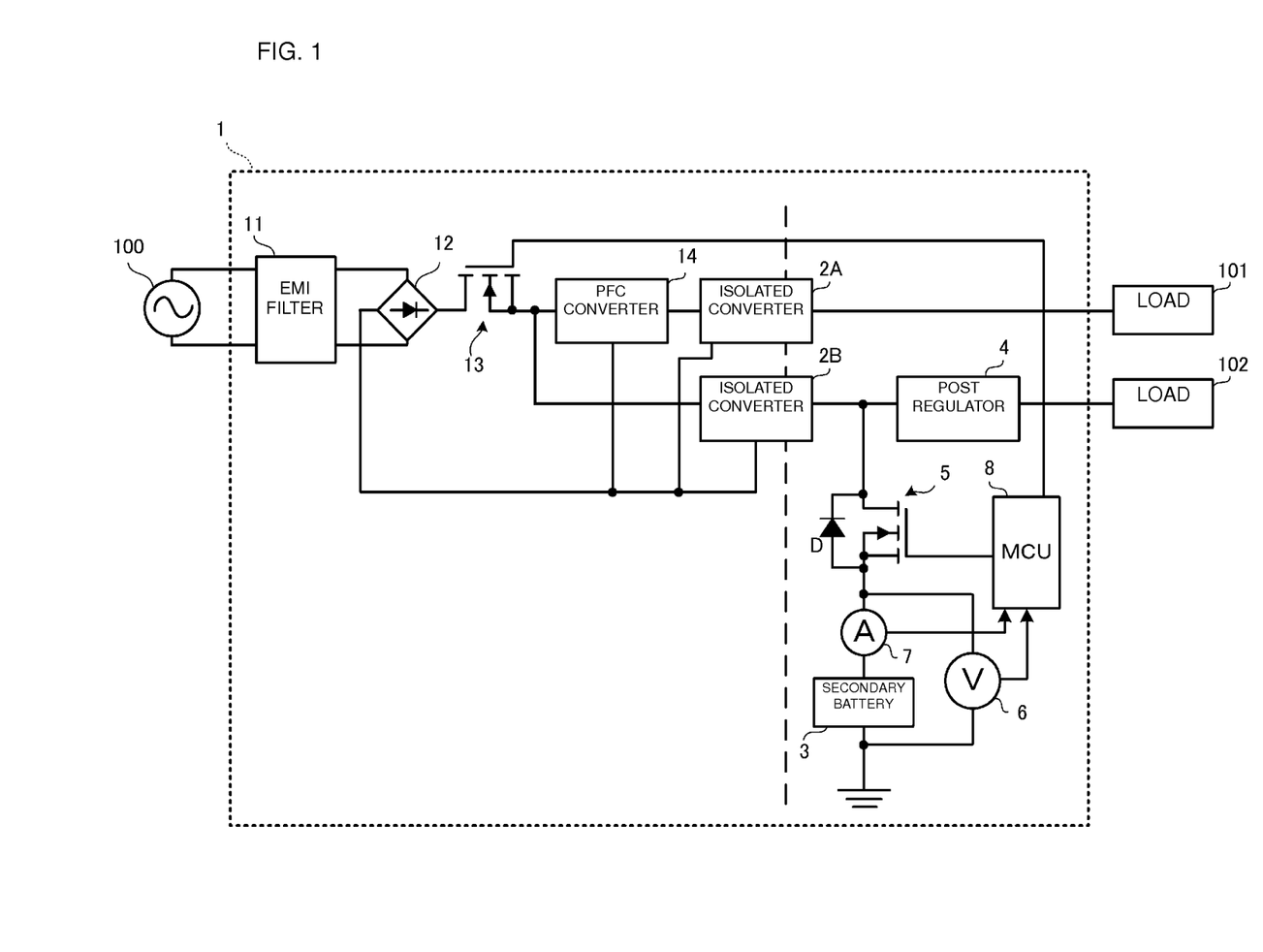
FIG. 1 is a circuit diagram of a switching power supply apparatus according to a first preferred embodiment of the present invention.

FIG. 1 is a circuit diagram of a switching power supply apparatus according to a first preferred embodiment of the present invention. A switching power supply apparatus 1 converts alternating-current voltage (power-supply voltage of the present invention) supplied from a commercial power supply 100 into direct-current voltage to supply the direct-current voltage to loads 101 and 102. The commercial power supply 100 is, for example, an alternating-current power supply of 100 V to 230 V. For example, when the switching power supply apparatus 1 is used in a copier machine, each of the loads 101 and 102 is a motor or a drive control circuit of the copier machine. For example, the load 101 is a high power load and the load 102 is a low power load. The load 101 is a circuit or the like that does not operates in a light load state (a standby mode) and the load 102 is a circuit or the like that constantly operates also in the light load state (the standby mode).

The switching power supply apparatus 1 includes isolated converters 2A and 2B. Each of the isolated converters 2A and 2B is a direct current (DC)-DC converter including a switching transformer. The isolated converter 2B corresponds to a "converter circuit" and has efficiency characteristics in which the power conversion efficiency in a rated load state is higher than the power conversion efficiency at the light load. A rectifier circuit at a secondary side of the isolated converter 2B is, for example, a synchronous rectifier circuit and has efficiency characteristics in which the power conversion efficiency in the rated load state is higher than the power conversion efficiency at the light load. Since the isolated converters 2A and 2B each adopt the synchronous rectification mode, it is possible for the isolated converters 2A and 2B to reduce the loss in the rectifier device to realize high efficiency, compared with diode rectification (asynchronous rectification). The configurations of the isolated converters 2A and 2B are not specifically limited and may be appropriately designed.

The switching power supply apparatus 1 includes an electromagnetic interference (EMI) filter 11, a diode bridge circuit 12, an n-type metal oxide semiconductor field effect transistor (hereinafter simply referred to as an FET) 13, and a power factor correction (PFC) converter 14 at its primary side. The commercial power supply 100 is connected to the EMI filter 11 to prevent leakage or invasion of noise through wiring. The diode bridge circuit 12 performs full-wave rectification to the alternating-current voltage from which the noise is reduced in the EMI filter 11.

The drain of the FET 13 is connected to the diode bridge circuit 12 and the source thereof is connected to the PFC converter 14 and the isolated converter 2B. The gate of the FET 13 is connected to a micro control unit (MCU) 8 described below and the FET 13 is turned on and off by the MCU 8. Although the FET 13 is a switching unit and is an electronic switch (transistor) using the FET, the FET 13 may be a relay that connects and blocks a power line with mechanical contacts to improve the safety at the shutoff, thus improving the reliability. The PFC converter 14 is a circuit to improve the power factor and is connected to the isolated converter 2A.

The switching power supply apparatus 1 includes a secondary battery 3, a post regulator 4, an FET 5, a voltage detector 6, a current detector 7, and the MCU 8 at its secondary side. The voltage detector 6 detects the voltage of the secondary battery 3 to supply the result of the detection to the MCU 8. The current detector 7 detects the current flowing into the secondary battery 3 to supply the result of the detection to the MCU 8.

The MCU 8 is configured and programmed to control turning on and off of the FET 13 and the FET 5 on the basis of the amount of charge in the secondary battery 3, which is acquired from the results of the detection in the voltage detector 6 and the current detector 7.

The drain of the FET 5 is connected to the isolated converter 2B, the source thereof is connected to the secondary battery 3, and the gate thereof is connected to the MCU 8. In response to turning on or off of the FET 5, the secondary battery 3 stores the direct-current voltage supplied from the isolated converter 2B or discharges (outputs) the direct-current voltage that is charged. The post regulator (dropper) 4 is connected to the isolated converter 2B. The post regulator 4 reduces high-frequency ripples of the direct-current voltage output from the isolated converter 2B or the secondary battery 3 to supply the direct-current voltage to the load 102.

In the switching power supply apparatus 1 having the above configuration, if the amount of charge in the secondary battery 3 is lower than a threshold value (a second threshold value of the present invention), the MCU 8 turns on the FET 13 and the FET 5. This threshold value is, for example, the amount of charge in the secondary battery 3 with which the voltage allowing the load 102 to be driven can be supplied. In response to turning on of the FET 13, the direct-current voltage output from the isolated converter 2A is supplied to the load 101. The direct-current voltage output from the isolated converter 2B is supplied to the load 102 through the post regulator 4. Concurrently, the direct-current voltage output from the isolated converter 2B is supplied to the secondary battery 3 to cause the secondary battery 3 to start the charge. A state in which the FET 13 is turned on and the voltage from the commercial power supply 100 is being supplied to the loads 101 and 102 is hereinafter referred to as a drive state of the isolated converters 2A and 2B.

Upon detection of full charge of the secondary battery 3, the MCU 8 turns off the FET 13 so as not to cause overcharge of the secondary battery 3. The MCU 8 may turn off the FET 13 if the amount of charge in the secondary battery 3 is higher than or equal to an amount of charge close to the full charge (a first threshold value of the present invention), instead of the full charge of the secondary battery 3.

The MCU 8 turns on the FET 5 in the state in which the FET 13 is turned off. The direct-current voltage stored in the secondary battery 3 is supplied to the load 102 through the source and the drain of the FET 5 at this time. A state in which the FET 13 is turned off and the isolated converters 2A and 2B do not operate is hereinafter referred to as a frozen state of the isolated converters 2A and 2B. In the frozen state, the voltage stored in the secondary battery 3 is supplied to the load 102 while no voltage is supplied to the load 101.

When the FET 5 is turned on in the frozen state of the isolated converters 2A and 2B and current flows between the source and the drain of the FET 5, conduction loss caused by forward voltage of the diode is suppressed, compared with a case in which current flows through a body diode D of the FET 5, to achieve higher efficiency, compared with the case in which the FET 5 is turned off.

In the present preferred embodiment, the operation of the switching power supply apparatus 1 in the drive state or the frozen state depending on the amount of charge in the secondary battery 3 allows monthly (daily or weekly) accumulated power usage [Wh] of a device (for example, the copier machine) having the switching power supply apparatus 1 installed therein to be greatly reduced, compared with an efficiency improvement technology in related art. Reasons why the accumulated power usage [Wh] is not sufficiently reduced with the efficiency improvement technology in the related art will be described below.

In a configuration in the related art, the secondary battery is provided, as in the present preferred embodiment, and the voltage from the commercial power supply is supplied to the load when the load 101 is in the rated load state (a so-called operation mode) and the charge voltage in the secondary battery is supplied to the load when the load 101 is in the light load state (the so-called standby mode). The supply of the power to the load is efficiently performed depending on the state at the load side in the above manner to reduce the amount of power supply per unit time, thus realizing the improvement in the efficiency in the efficiency improvement technology in the related art.

Figure 2:
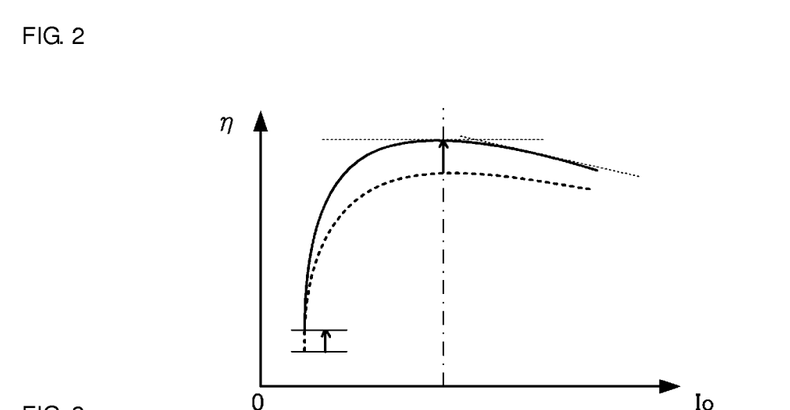
FIG. 2 is a diagram illustrating an efficiency curve in an efficiency improvement technology in related art.

FIG. 2 is a diagram illustrating an efficiency curve in the efficiency improvement technology in the related art. In the graph illustrated in FIG. 2, the horizontal axis represents output current Io and the vertical axis represents efficiency 11 of the power supply. The load side is at heavy load when the output current Io is large and the load side is at the light load when the output current Io is small. The efficiency 1 is equal to Po/Pi ($\eta$=Po/Pi) where Pi denotes input power and Po denotes output power. The input power Pi is equal to Po+$P_{loss}$ (Pi=Po+$P_{loss}$) where $P_{loss}$ denotes power loss.

Improvement of the efficiency $\eta$ from a broken-line curve to a solid-line curve with the efficiency improvement technology in the related art is illustrated in FIG. 2. In the related art, the power loss is reduced by, for example, improving the performance of electronic devices in a power conversion circuit to increase the entire efficiency $\eta$ from the light load to the heavy load, as illustrated in FIG. 2, thus entirely reducing the power loss. However, the efficiency $\eta$ at the light load is still low in this case. For example, in the case of the copier machine, since the time of the light load state (the standby mode) in one day is longer than the time of the rated load state (the operation mode), higher improvement rate (the reduction in the accumulated power usage [Wh]) is not expected if the improvement rate of the efficiency $\eta$ in the light load state is low.

Reasons why the accumulated power usage [Wh] is greatly reduced with the switching power supply apparatus 1 according to the present preferred embodiment will be described below with reference to graphs.

Figure 3:
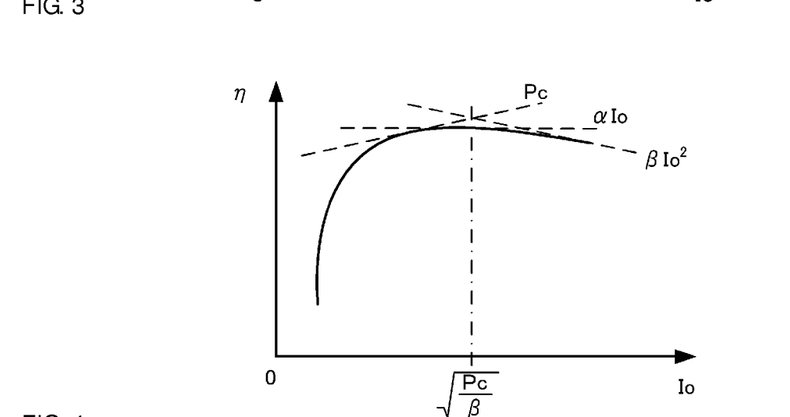
FIG. 3 is a graph for describing a peak value of efficiency η.

FIG. 3 is a graph for describing a peak value of the efficiency $\eta$. In general, the power loss $P_{loss}$ in the isolated converter is represented by the sum of loss (proportional loss) αIo proportional the output current, loss (fixed loss) Pc that has no relationship to the output current, and loss (square proportional loss) βIo² proportional to the square of the output current. The efficiency η is represented by the following Equation (1):

Math 1

$$\eta = \frac{Po}{Po + P_{loss}} \quad (1)$$
$$= \frac{Vo \cdot Io}{Vo \cdot Io + (Pc + \alpha Io + \beta Io^2}$$
$$= \frac{Vo}{Vo + \left(\frac{Pc}{Io} + \alpha + \beta Io\right)}$$

As illustrated in FIG. 3, since the fixed loss Pc has no relationship to the output current, the ratio of the fixed loss Pc to the output current is decreased with the increasing output current. In other words, the efficiency η based on the fixed loss Pc is increased with the increasing output current. In contrast, the ratio of the square proportional loss βIo² to the output current is increased with the increasing output current. In other words, the efficiency η based on the square proportional loss βIo² is decreased with the increasing output current. Accordingly, the efficiency η has the peak value when the fixed loss Pc is equal to the square proportional loss βIo². The efficiency η has the peak value when Pc/Io=βIo and the efficiency η is maximized when Io=√(Pc/β).

Figure 4:
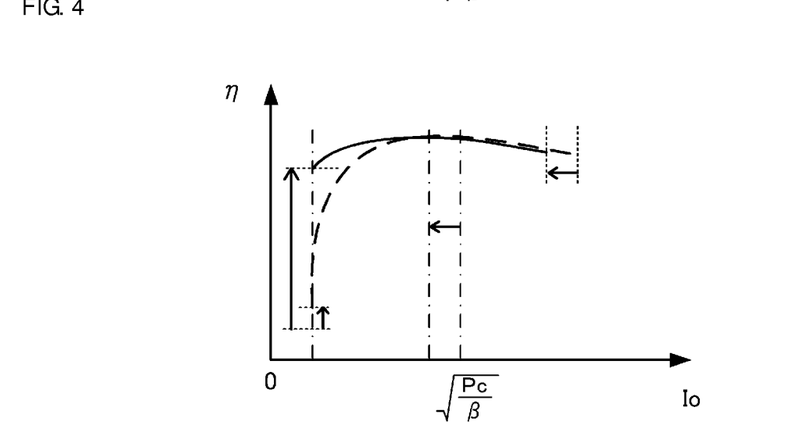
FIG. 4 is a diagram illustrating an efficiency curve in the switching power supply apparatus according to the first preferred embodiment of the present invention.

FIG. 4 is a diagram illustrating an efficiency curve in the switching power supply apparatus 1 according to the present preferred embodiment. Great improvement of the power efficiency at the light load by moving the peak value of the efficiency η (Io=√(Pc/β)) toward the light load side is illustrated in FIG. 4. In order to greatly improve the power efficiency, it is necessary to make Io=√(Pc/β) small. If β is increased, the square proportional loss βIo² is increased to disadvantageously increase the power loss. Accordingly, it is necessary to decrease the fixed loss Pc.

However, since the fixed loss Pc has no relationship to the output current Io, it is necessary to use variable loss related to the output current Io in order to decrease the fixed loss Pc. Conversion of the fixed loss into the variable loss is enabled by varying a period during which the isolated converters 2A and 2B are in the drive state and a period during which the isolated converters 2A and 2B are in the frozen state depending on the weight of the load 101 to supply the power. Specifically, the isolated converters 2A and 2B are caused to operate in a high-efficiency state to charge the secondary battery 3 and supply the voltage from the secondary battery 3 to the load 102 in the frozen state if the amount of charge in the secondary battery 3 is lower than or equal to the threshold value even at the light load. Accordingly, the input power in the frozen state is infinitely close to zero.

Reasons why the accumulated power usage [Wh] is reduced with the switching power supply apparatus 1 according to the present preferred embodiment will be described below using expressions.

Figure 5A:
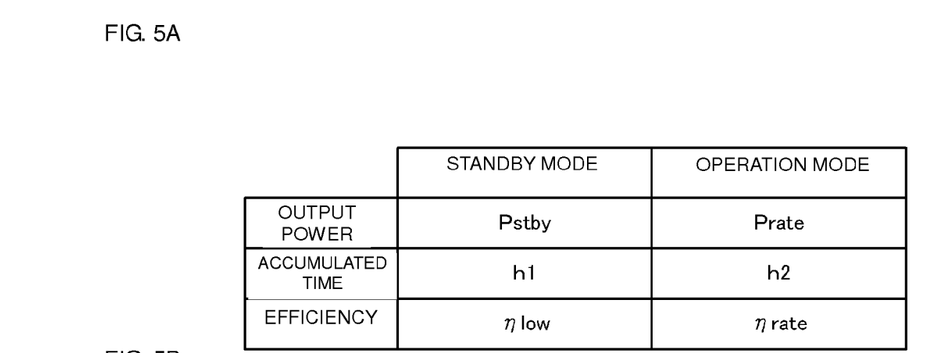
FIG. 5A is a table illustrating output power, an accumulated time, and power conversion efficiency in a configuration in the related art.
Figure 5B:
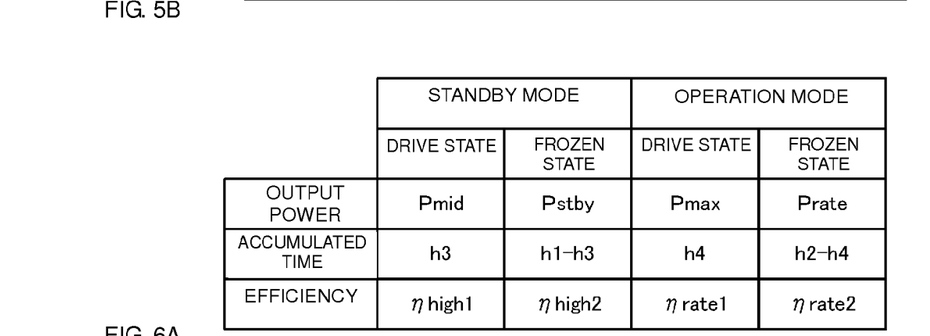
FIG. 5B is a table illustrating output power, the accumulated time, and the power conversion efficiency in the configuration of a preferred embodiment of the present invention.

FIG. 5A is a table illustrating the output power, an accumulated time, and the power conversion efficiency in the configuration in the related art. FIG. 5B is a table illustrating the output power, the accumulated time, and the power conversion efficiency in the configuration of the present preferred embodiment. Each value in FIG. 5B is for the load 102.

In the configuration in the related art, as illustrated in FIG. 5A, the output power to the load 102 is denoted by Pstby, the power conversion efficiency is denoted by ηlow, and the accumulated time when the load 102 enters the standby mode is denoted by h1 in the standby mode. The output power to the load 102 is denoted by Prate, the power conversion efficiency is denoted by ηrate, and the accumulated time when the load 102 enters the operation mode is denoted by h2 in the operation mode.

In the configuration of the present preferred embodiment, as illustrated in FIG. 5B, the total accumulated time of the drive state and the frozen state in the standby mode is equal to the accumulated time h1 of the standby mode in the related art and the total accumulated time of the drive state and the frozen state in the operation mode is equal to the accumulated time h2 of the operation mode in the related art. In the frozen state in the standby mode and the operation mode, that is, when the power is supplied from the secondary battery 3 to the load 102, the output power to the load 102 in the standby mode is the output power Pstby in the related art and the output power to the load 102 in the operation mode is the output power Prate in the related art.

Pmid>Pstby where Pmid denotes the output power in the drive state in the standby mode because the charge power to the secondary battery 3 is required. The accumulated time in the frozen state is equal to h1-h3 where h3 denotes the accumulated time in the drive state in the standby mode. Pmax>Prate where Pmax denotes the output power in the drive state in the operation mode because the charge power to the secondary battery 3 is required. The accumulated time in the frozen state is equal to h2-h4 where h4 denotes the accumulated time in the drive state in the operation mode. The power conversion efficiency in the drive state in the standby mode is denoted by ηhigh1 and the power conversion efficiency in the frozen state in the standby mode is denoted by ηhigh2. The power conversion efficiency in the drive state in the operation mode is denoted by ηrate1 and the power conversion efficiency in the frozen state in the operation mode is denoted by ηrate2. The power conversion efficiency ηhigh2 and the power conversion efficiency ηrate2 in the frozen state are the efficiencies when the power is supplied from the secondary battery 3 to the load 102.

The output power in the operation mode is higher than the output power in the standby mode. Accordingly, the magnitude relationship between the respective output powers is represented by Pmax>Prate>Pmid>Pstby. Since the high efficiency is generally achieved when the output power to the load is high, the magnitude relationship of the power conversion efficiencies of the isolated converter are represented by ηrate1≥ηrate2>ηhigh1>ηlow. Accordingly, the magnitude relationship of the power conversion efficiencies are generally represented by ηrate1≥ηrate2>ηhigh2>ηhigh1>>ηlow.

The following equations are established:

$$Wh(prior) = Pstby/\eta low \times h1 + Prate/\eta rate \times h2$$

$$Wh(new) = Pmid/\eta high1 \times h3 + Pstby/\eta high2 \times (h1-h3) + Pmax/\eta rate1 \times h4 + Prate/\eta rate2 \times (h2-h4)$$

where Wh(prior) denotes a simple power usage in the related art and Wh(new) denotes a simple power usage of the present preferred embodiment.

In general, ηrate1≅ηrate2 and Pstby/ηhigh2×(h1−h3)<Pstby/ηlow×h1. Accordingly, the use of the isolated converter in which ηhigh1 is sufficiently higher then ηlow (ηhigh1>ηlow) so as to establish Pmid/ηhigh1×h3<Pstby/ηlow×h1 allows Wh(new)<Wh(prior) to be achieved. As described above, the switching power supply apparatus 1 according to the present preferred embodiment is capable of reducing the power usage per unit period, compared with the related art, to reduce the accumulated power usage [Wh].

FIG. 6A to FIG. 6D are diagrams illustrating results of comparison in the power conversion efficiency and the power loss between the related art and the present preferred embodiment. Each value in the related art is represented by a broken line and each value of the present preferred embodiment is represented by a sold line in FIG. 6A to FIG. 6D.

Figure 6A:
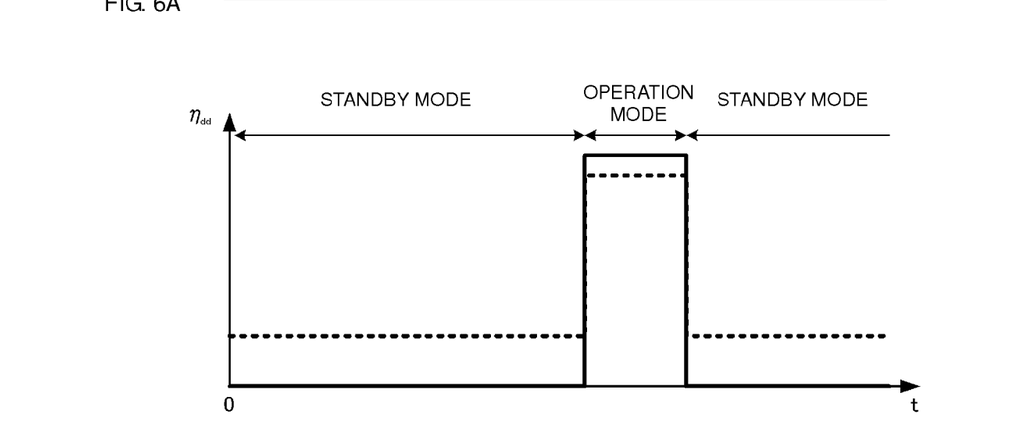
FIG. 6A is a diagram illustrating a result of comparison in the power conversion efficiency and power loss between the related art and the present preferred embodiment of the present invention and illustrates power conversion efficiency ηdd of an isolated converter.

FIG. 6A illustrates power conversion efficiency ηdd of the isolated converter 2B. In the present preferred embodiment, no output power is output from the isolated converter 2B and no current flows through the isolated converter 2B in the frozen state in the standby mode and the operation mode. As illustrated in FIG. 5B, the output power in the operation mode of the present preferred embodiment is higher than that in the related art. Accordingly, the power conversion efficiency ηdd of the isolated converter 2B of the present preferred embodiment is improved, compared with the related art.

Figure 6B:
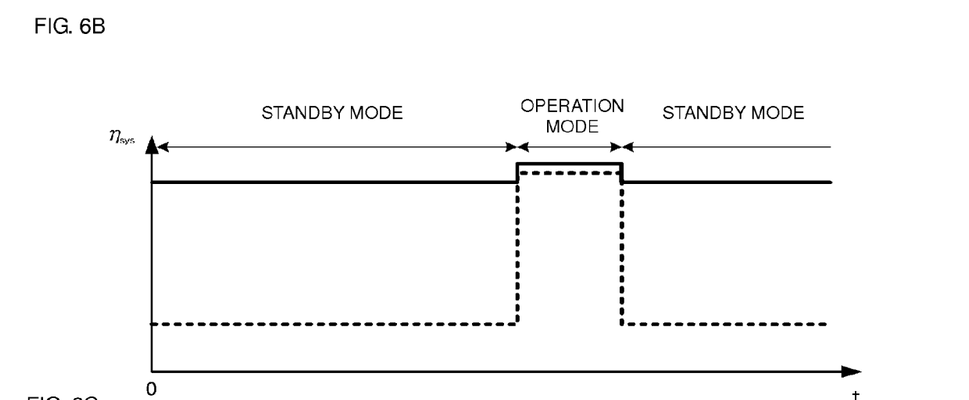
FIG. 6B is a diagram illustrating a result of the comparison in the power conversion efficiency and the power loss between the related art and the present preferred embodiment of the present invention and illustrates conversion efficiency ηsys of the switching power supply apparatus.

FIG. 6B illustrates conversion efficiency ηsys of the switching power supply apparatus 1. The power is supplied to the load 102 not from the isolated converter 2B but from the secondary battery 3 in the frozen state in the standby mode. In the drive state in the operation mode, the input power of the present preferred embodiment is higher than that in the related art because the charge power to the secondary battery 3 is added. Accordingly, the conversion efficiency ηsys of the switching power supply apparatus 1 of the present preferred embodiment is improved, compared with the related art.

Figure 6C:
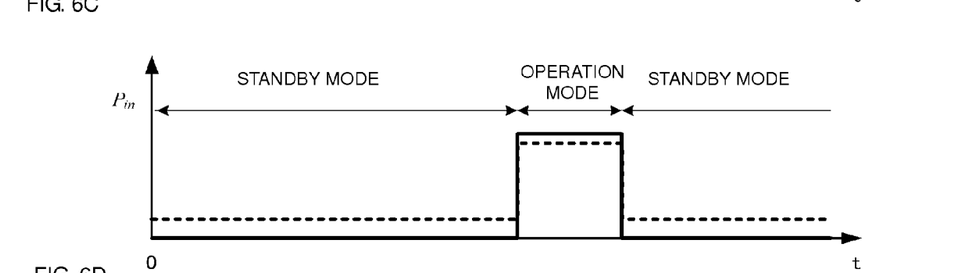
FIG. 6C is a diagram illustrating a result of the comparison in the power conversion efficiency and the power loss between the related art and the present preferred embodiment of the present invention and illustrates a used power amount Pin of a commercial power supply.

FIG. 6C illustrates a used power amount Pin of the commercial power supply 100. In the related art, a small used power amount occurs even in the standby mode and the power usage is high in the operation mode. In contrast, in the present preferred embodiment, no power usage occurs in the frozen state in the standby mode and the power usage of the present preferred embodiment is higher than that in the related art in the drive state in the operation mode because the charge power with which the secondary battery 3 is charged is added.

Figure 6D:
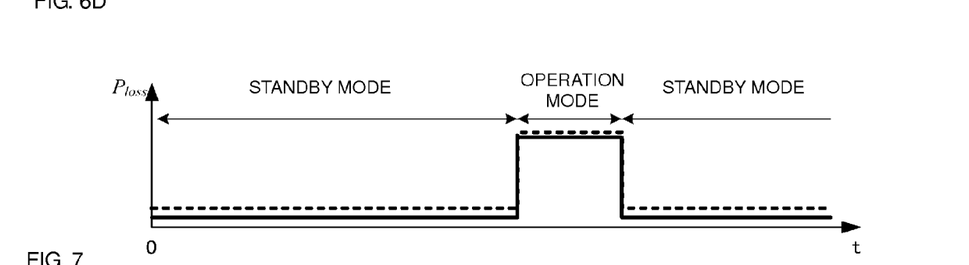
FIG. 6D is a diagram illustrating a result of the comparison in the power conversion efficiency and the power loss between the related art and the present preferred embodiment of the present invention and illustrates power loss $P_{loss}$ of the switching power supply apparatus.

FIG. 6D illustrates the power loss $P_{loss}$ of the switching power supply apparatus 1. In the related art, low power loss occurs in the standby mode and the power loss is increased in the operation mode. In the present preferred embodiment, the power loss $P_{loss}$ is low in the drive state in the standby mode because the power is supplied from the secondary battery 3. The efficiency of the present preferred embodiment is higher than that in the related art in the operation mode because the charge power with which the secondary battery 3 is charged is added. However, the loss in the present preferred embodiment is nearly equal to that in the related art because the power that is processed is increased in the present preferred embodiment.

Figure 7:
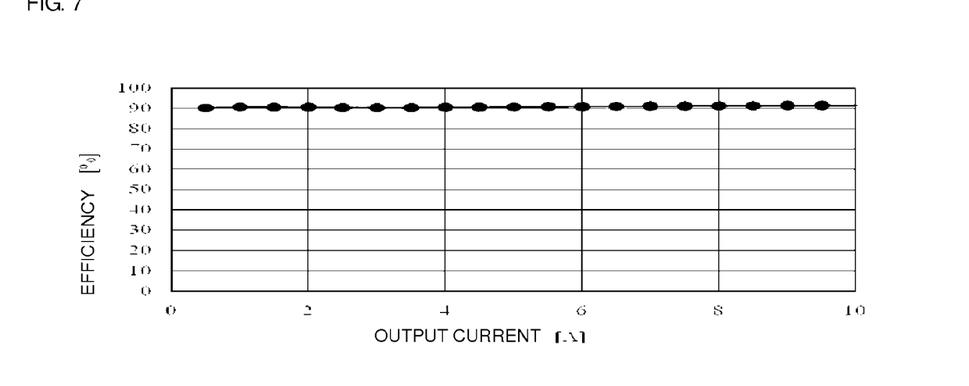
FIG. 7 is a diagram illustrating efficiency characteristics in which a frozen state period is varied depending on the weight of a load to vary the output power.

FIG. 7 is a diagram illustrating efficiency characteristics in a case in which the period during which the isolated converters are in the frozen state is varied depending on the weight of the load to vary the output power. As illustrated in FIG. 7, in the present preferred embodiment, the efficiency characteristics of the entire switching power supply apparatus 1 are constantly high regardless of the output current Io despite the fact that the isolated converter 2B having the efficiency characteristics illustrated in FIG. 3 is used.

As described above, it is possible to reduce the power usage per unit period, for example, the daily power usage or the monthly power usage in the present preferred embodiment. In addition, it is possible to reduce the power usage even in consideration of forgetting of turning off of a power switch of an electronic device, which is the load, to reduce the annual power usage, thus achieving power saving.

Second Preferred Embodiment

Figure 8:
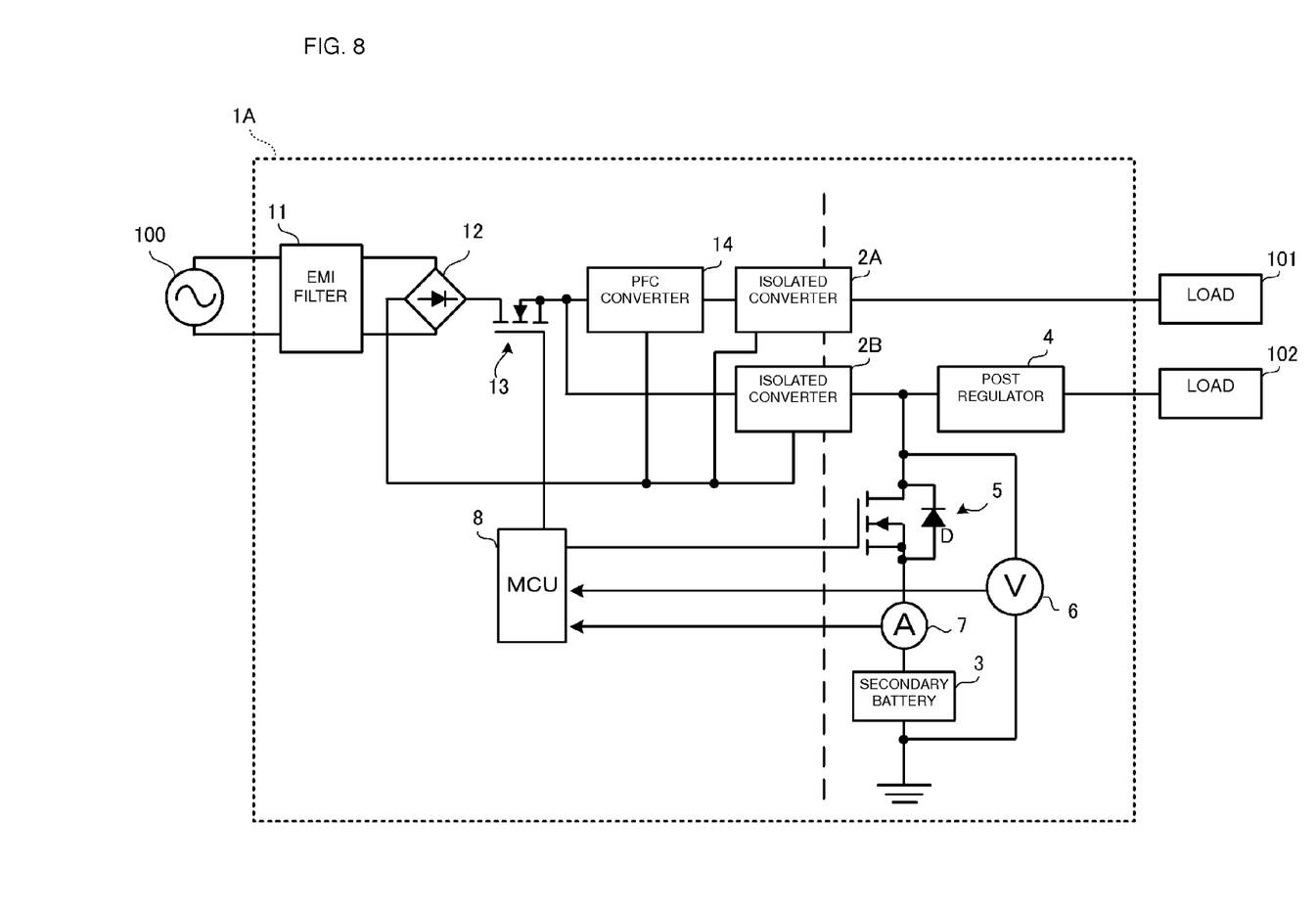
FIG. 8 is a circuit diagram of a switching power supply apparatus according to a second preferred embodiment of the present invention.

FIG. 8 is a circuit diagram of a switching power supply apparatus according to a second preferred embodiment of the present invention. The present preferred embodiment differs from the first preferred embodiment in that a switching power supply apparatus 1A includes the MCU 8 at the primary side. The other components of the second preferred embodiment are the same as those of the first preferred embodiment. The provision of the MCU 8 at the primary side enables the direct turning on and off of the FET 13, compared with the case in which the MCU 8 is provided at the secondary side. In the second preferred embodiment, it is possible to reduce the accumulated power usage [Wh], as in the first preferred embodiment and so on, and the provision of the MCU 8 and so on at the primary side when the size at the secondary side of the isolated converters 2A and 2B is increased due to the provision of safety standards, etc. allows the increase in the size at the secondary side to be significantly reduced or prevented.

Third Preferred Embodiment

Figure 9:
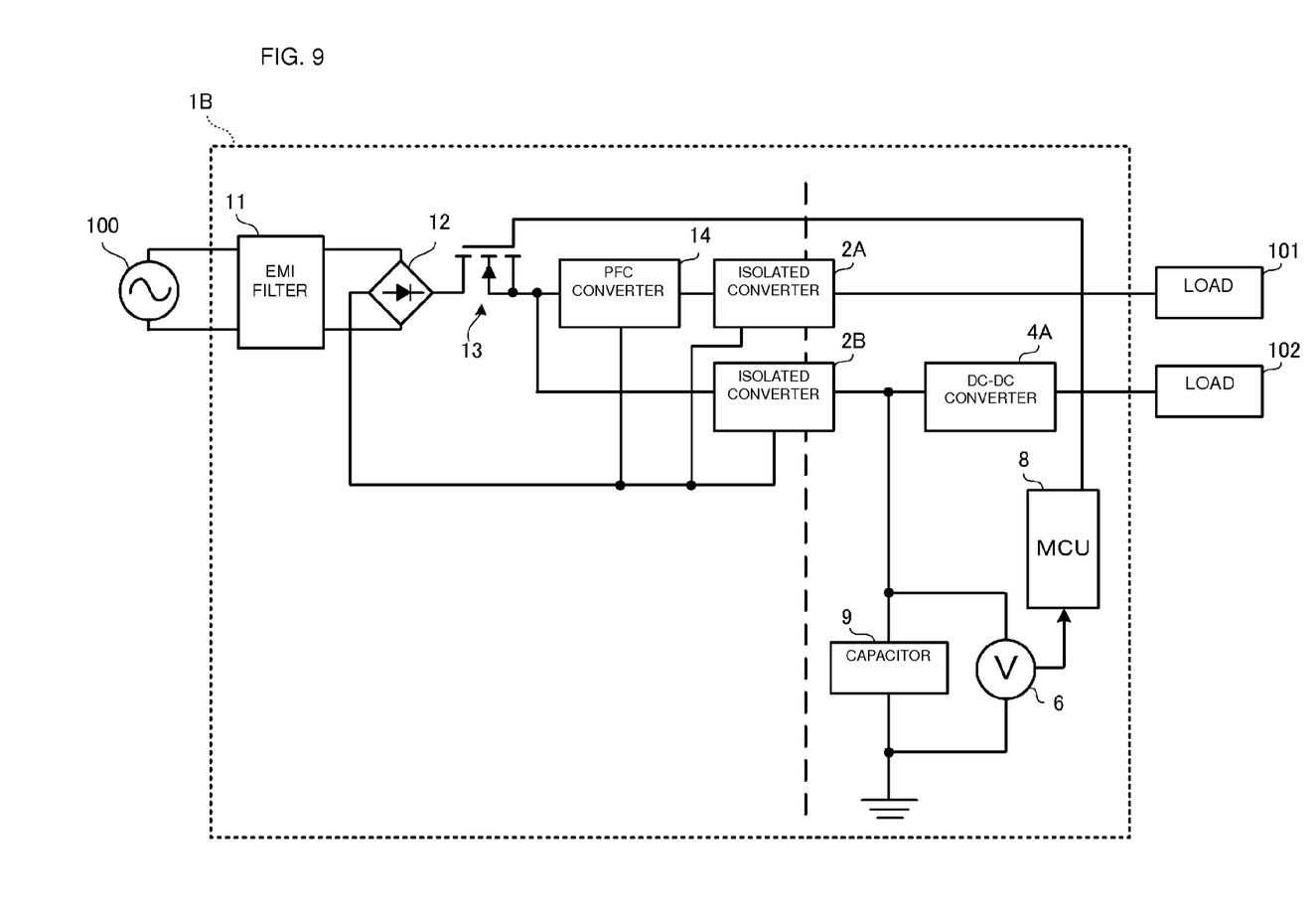
FIG. 9 is a circuit diagram of a switching power supply apparatus according to a third preferred embodiment of the present invention.

FIG. 9 is a circuit diagram of a switching power supply apparatus according to a third preferred embodiment of the present invention. A switching power supply apparatus 1B according to the third preferred embodiment includes a capacitor 9 as a charge unit. When the capacitor 9 is used as the charge unit, the life of the charge unit is lengthened, compared with the case in which the secondary battery 3 is used as the charge unit. The capacitor 9 is not in the overcharge and it is possible to prevent the capacitor 9 from being in overvoltage on the basis of the voltage of the voltage detector 6 under the control of the MCU 8. Accordingly, it is not necessary to provide the FET 5 of the first and second preferred embodiments to reduce the number of the devices in the switching power supply apparatus 1B. The capacitor 9 accumulates the electric charge as electrostatic energy while the secondary battery 3 accumulates the electricity with electrochemical reaction. In other words, the internal resistance of the capacitor 9 is lower than that of the secondary battery 3. Consequently, it is possible to shorten the charge time of the capacitor 9, compared with the charge time of the secondary battery 3. Since the use of the capacitor 9 allows the period of the drive state to be shortened and allows the period of the frozen state to be relatively lengthened, it is possible to reduce the loss in the isolated converters 2A and 2B.

An electric double layer capacitor may be used as the charge unit. Since the electric double layer capacitor has a capacitance higher than the capacitance of the normal capacitor, it is possible to lengthen the period of the frozen state to more greatly reduce the accumulated power usage [Wh].

The switching power supply apparatus 1B according to the third preferred embodiment includes a DC-DC converter 4A, instead of the post regulator 4, as a voltage conversion unit. In this case, it is possible to increase the power efficiency, compared with the case in which the post regulator 4 adopting the dropper method is used, and reduce the size of the device to realize space saving.

Fourth Preferred Embodiment

Figure 10:
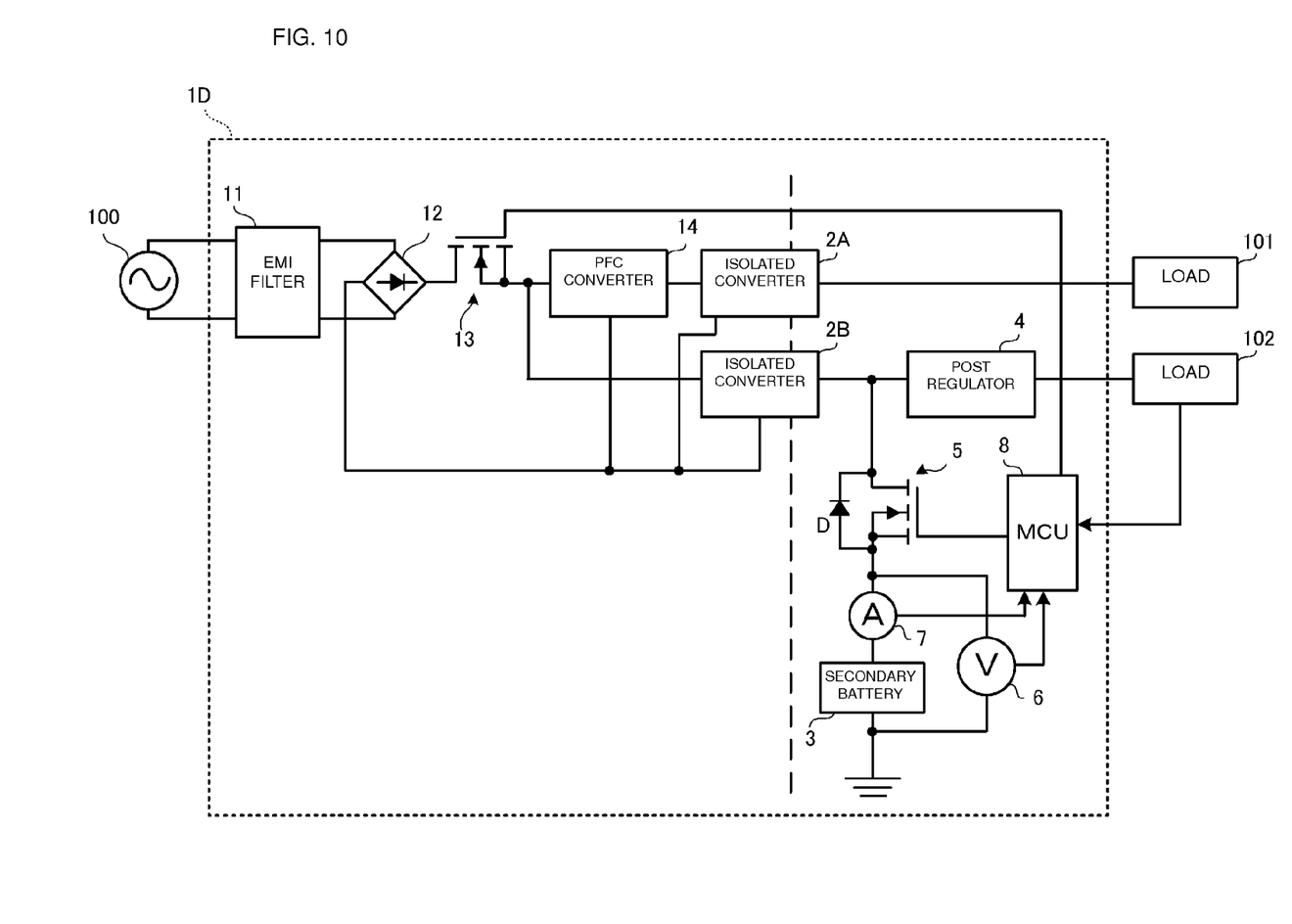
FIG. 10 is a circuit diagram of a switching power supply apparatus according to a fourth preferred embodiment of the present invention.

FIG. 10 is a circuit diagram of a switching power supply apparatus 1D according to a fourth preferred embodiment of the present invention. The switching power supply apparatus 1D according to the fourth preferred embodiment does not cause the isolated converters 2A and 2B to be in the frozen state but forcedly causes the isolated converters 2A and 2B to be in the drive state if the load 102 is in the rated load state even when the amount of charge in the secondary battery 3 is higher than or equal to the threshold value (the full charge). In the present preferred embodiment, the MCU 8 determines whether the load 102 is in the rated load state.

In order to determine whether the load 102 is in the rated load state, for example, the switching power supply apparatus 1D may include an output power detector that detects the output power to the load 102 and may determine that the load 102 is in the rated load state if the output power to the load 102, acquired from the result of the detection in the output power detector, is higher than or equal to a certain value. Alternatively, for example, the MCU 8 may receive an external signal to determine the state of the load 102. The circuit that transmits the external signal is a circuit to determine the state of the load 102. The circuit may be provided in the load 102 or may be provided separately from the load 102.

If the MCU 8 determines that the load 102 is in the rated load state, the MCU 8 sets the isolated converters 2A and 2B to the drive state even when the amount of charge in the secondary battery 3 is higher than or equal to the threshold value (in the full charge). In the rated load state, the rate of discharge from the secondary battery 3 is high and the amount of charge in the secondary battery 3 is rapidly decreased when the direct-current voltage is supplied from the secondary battery 3 in the frozen state. Accordingly, control in which the charge into the secondary battery 3 is started a short time after the discharge from the secondary battery 3 is repeated. As a result, the number of times of charge and discharge into and from the secondary battery 3 is increased to decrease the life of the secondary battery 3. Consequently, in the rated load state, the isolated converters 2A and 2B are forcedly set to the drive state regardless of the amount of charge in the secondary battery 3 to supply the direct-current voltage from the isolated converter 2B to the load 102. When the secondary battery 3 is in the full charge, the MCU 8 turns off the FET 5 to stop the charge into the secondary battery 3. This prevents the overcharge into the secondary battery 3 to protect the secondary battery 3.

The specific configurations and so on of the switching power supply apparatuses of the preferred embodiments described above may be appropriately subjected to design change. The effects and advantages described in the above preferred embodiments are only preferred effects and advantages of the present invention and the effects and advantages according to the present invention are not limited to the ones described in the above preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
   a converter circuit configured to have efficiency characteristics in which power conversion efficiency at a rated load is higher than power conversion efficiency at a light load and that converts power-supply voltage into direct-current voltage to output the direct-current voltage;
   a switching unit configured to switch supply and shutoff of the power-supply voltage to the converter circuit, such that when the switching unit is switched to shut off the power-supply voltage to the converter circuit, the power-supply voltage is prevented from being input to the converter circuit;
   a charge unit configured to store the direct-current voltage output from the converter circuit;
   a detecting unit configured to detect an amount of charge in the charge unit; and
   a controller configured and programmed to switch the switching unit based on the amount of charge detected by the detecting unit; wherein
   the controller is configured and programmed to set the switching unit to the shutoff state if the amount of charge in the charge unit is higher than a first threshold value and set the switching unit to the supply state if the amount of charge in the charge unit is lower than a second threshold value;
   the controller is configured and programmed to output the direct-current voltage subjected to the conversion in the converter circuit and store the direct-current voltage subjected to the conversion in the converter circuit in the charge unit when the switching unit is in the supply state and output the direct-current voltage stored in the charge unit when the switching unit is in the shutoff state; and
   a frozen period in which the switching unit is in the shutoff state is controlled depending on an increase and a decrease of output power and the frozen period is lengthened with the decreasing output power.

2. The switching power supply apparatus according to claim 1, further comprising a voltage conversion unit configured to perform voltage conversion of the direct-current voltage output from the charge unit.

3. The switching power supply apparatus according to claim 2, wherein the voltage conversion unit is a DC-DC converter.

4. The switching power supply apparatus according to claim 1, wherein the switching unit is a transistor.

5. The switching power supply apparatus according to claim 1, wherein the switching unit is a mechanical switch.

6. The switching power supply apparatus according to claim 1, wherein the charge unit is a secondary battery.

7. The switching power supply apparatus according to claim 1, wherein the charge unit is a capacitor.

8. The switching power supply apparatus according to claim 7, wherein the charge unit is an electric double layer capacitor.

9. The switching power supply apparatus according to claim 1, wherein the converter circuit includes a synchronous rectifier circuit.

10. The switching power supply apparatus according to claim 1, wherein
    the converter circuit is an isolated converter including an isolated transformer; and
    the controller is provided at a primary side of the converter circuit.

11. The switching power supply apparatus according to claim 1, wherein
the converter circuit is an isolated converter including an isolated transformer; and
the controller is provided at a secondary side of the converter circuit.

12. The switching power supply apparatus according to claim 1, wherein the converter circuit includes two isolated converters.

13. The switching power supply apparatus according to claim 12, wherein the two isolated converters are isolated DC-DC converters including a switching transformer.

14. The switching power supply apparatus according to claim 1, further comprising an electromagnetic interference filter, a diode bridge circuit, an n-type metal oxide semiconductor field effect transistor, and a power factor correction converter at a primary side.

15. The switching power supply apparatus according to claim 1, further comprising a secondary battery, a post regulator, an n-type metal oxide semiconductor field effect transistor, a voltage detector, a current detector, and the controller at a secondary side.

* * * * *